(No Model.)

T. B. JEFFERY.
PNEUMATIC TIRE.

No. 584,115. Patented June 8, 1897.

Witnesses.
E. T. Wray.
Jean Elliott.

Inventor
Thomas B. Jeffery
by Burton and Burton
his attys.

UNITED STATES PATENT OFFICE.

THOMAS B. JEFFERY, OF CHICAGO, ILLINOIS.

PNEUMATIC TIRE.

SPECIFICATION forming part of Letters Patent No. 584,115, dated June 8, 1897.

Application filed May 16, 1895. Serial No. 549,489. (No model.)

*To all whom it may concern:*

Be it known that I, THOMAS B. JEFFERY, a citizen of the United States, residing at Chicago, county of Cook, and State of Illinois, have invented certain new and useful Improvements in Pneumatic Tires, which are fully set forth in the following specification, reference being had to the accompanying drawings, forming a part thereof.

Figure 1:
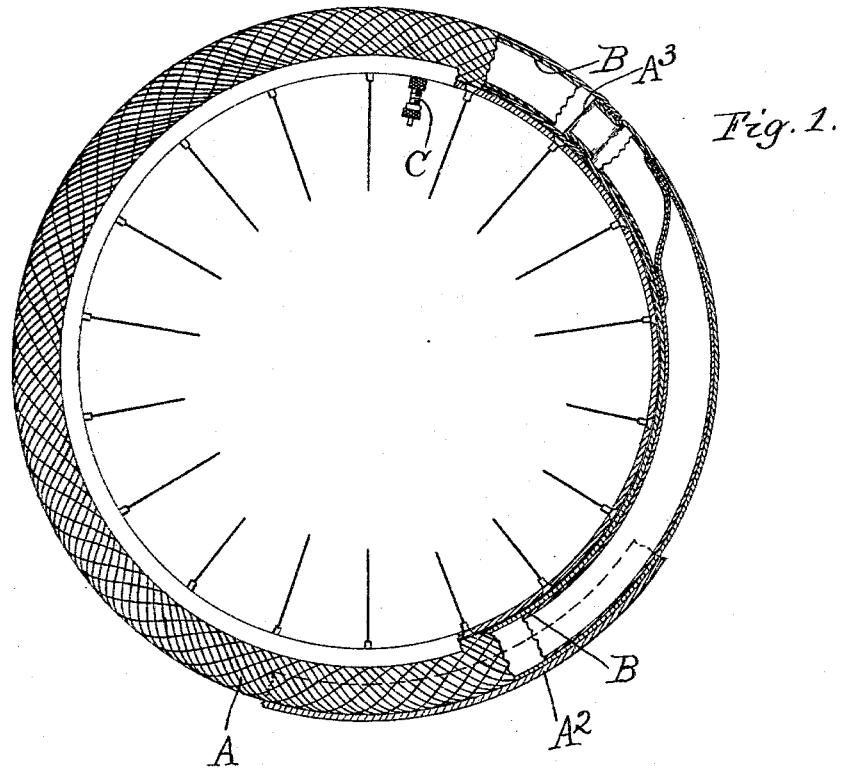
Figure 2:
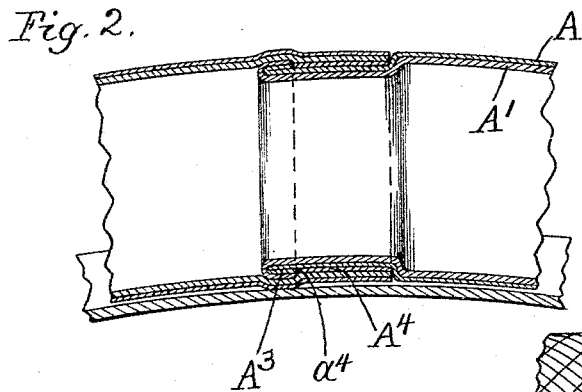
Figure 3:
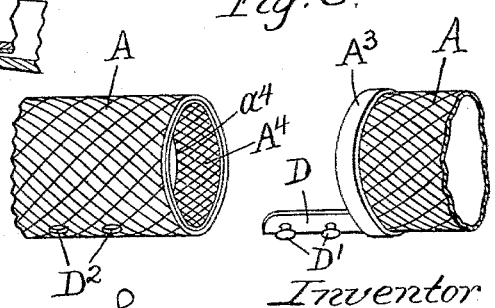

In the drawings, Figure 1 is a side elevation, sectional in part, at a plane transverse to the axis of the whole rim and tire embodying my invention. Fig. 2 is an enlarged detail section in the same plane, showing only a portion of the rim and tire at the junction of the ends of the latter. Fig. 3 is a detail perspective showing a specific device for coupling the telescoping ends of the tube together.

In constructing my improved tire I make first a tube of bias fabric—that is, a fabric in which the threads do not run directly around nor directly lengthwise of the tube, but obliquely around the tube in both directions. Such tube may be made according to any of the well-known methods. I have shown it as made of a flat bias strip folded up and having its edges lapped and joined at that side of the tire which becomes the inner side when it is applied to the wheel-rim. Preferably before joining the inner seam or in the same process this fabric is given a rubber coating, which is subsequently vulcanized, on the surface which is to be the inner surface when it is folded into tubular form, and it may also receive a rubber coating suitable for the tread upon the surface which is the outer surface when the tire is in use upon the wheel. A proper length of this tubing to constitute the tire for a given sized wheel being cut off, one end of the same is provided with an exterior bead elastically extensible circumferentially with respect to the tube, which may be made by merely folding the edge of the fabric, which is itself elastic circumferentially with respect to the tube, back on itself on the outer side and cementing it down. The other end of the tube is provided with an interior non-extensible reinforcement, which constitutes also a thickening of the tube and makes more or less of a shoulder on the inner side. This may be done by cementing to the inner surface of the tube a strip of canvas or other firm fabric cut lengthwise, so as to be practically non-extensible. An inflatable rubber tube of such length that when inflated and thereby slightly extended longitudinally its ends will meet when it is placed around the wheel may now be drawn into the tube formed as above described, and the tube being then laid about the rim in the seat provided for it and the end having the exterior elastically-extensible bead being inserted within the end having the interior non-extensible reinforcement, and the inner tube being inflated, provision for so inflating it having been made in the usual manner by an inflating-nozzle secured to it and protruding through the outer tube at any convenient point, the pressure of such inner expanded tube against the outer tube forces the elastically-extensible bead of the inner lapped end out against the inner surface of the outer lapped end of the tube into which said inner end is inserted and stretches the outer lapped end of the tube itself just behind the shoulder formed by the inextensible reinforcement, and thereby locks the two ends of the tube together, the lock becoming more secure as the tension in the tube increases.

A is the outer tube of bias fabric, having the rubber-lining coat A' and adapted to have, if desired, an exterior rubber tread $A^2$.

$A^3$ is a bead, preferably elastic, which may be formed by folding one end of the tube, which is itself elastic circumferentially, back upon itself and cementing it down.

$A^4$ is a non-extensible reinforcing-ring, which may be of canvas or other suitable material, which is attached to the inner surface of the other end of the tube and forms the stop or locking shoulder at $a^4$, against which the bead $A^3$ stops and behind which it engages when the tube is inflated, as described.

B is the inner inflation-tube of pure rubber, adapted to expand as it is inflated until it first fills the outer tube and then slightly stretches that tube, which, being stretched circumferentially, becomes shortened longitudinally—that is, circumferentially with respect to the wheel—and is thereby drawn tightly into its seat on the rim.

C is the customary nozzle for inflating the inner tube. It may be secured in any familiar manner to the inner tube and protruded through the outer tube and secured also to said outer tube. The devices represented for this purpose are familiar and form no part of this invention and need not be described in detail.

The inner air-tube may be dispensed with and the outer tube directly inflated if sufficient care is taken in inserting the exterior bead to seat it air-tight against the inner surface of the tube, so that upon forcing air into the tube tension may be produced therein from the start. As soon as any tension is thus produced the bead will be seated more securely, and thus the inflation may be continued until any tension desired is obtained. For this purpose of making the junction air-tight the use of cement at the contacting surfaces of the telescoped ends of the tube is desirable. As a matter of convenience in keeping the ends united while manipulating the tire in putting it into place on the wheel and causing them to remain united when the tire is deflated suitable locking devices, as buttons, hooks, or other catches, may be provided in any suitable positions at the ends, respectively, as shown in Fig. 3, wherein D is a lug which projects from one end and has one element of the interlocking device, as buttons D' D', the other end being provided with the other element, as eyelets $D^2 D^2$. These special interlocking devices may be present whether an inner air-tube is used or not, and this expedient is a further carrying out in detail of the generic idea of the invention, which is that the two ends of the tube are provided with counterpart devices adapted to be locked or stopped one against the other, as the shoulder and bead above described, and that such outer parts are adapted to be forced into and held in engagement by the interior air-pressure either acting directly or through an inner air-tube.

I claim—

1. A pneumatic tire comprising a tube having open ends, one of the open ends being telescoped within the other, said ends being provided with devices adapted to interlock or stop one against the other when the ends are thus telescoped, and to be held in engagement by the inflation of the same: substantially as set forth.

2. A pneumatic tire comprising a tubular casing open at both ends and provided with devices adapted to interlock and stop one against the other to hold the ends engaged when one end has been telescoped within the other, and an air-tube within such casing provided with means for inflating it from the exterior of the casing: substantially as set forth.

3. A tube for a pneumatic tire open at both ends having one end beaded exteriorly and the other end circumferentially non-extensible, the tube being elastically extensible circumferentially back of the non-extensible end, whereby the beaded end is adapted to be inserted within the non-extensible end and held therein by inflation: substantially as set forth.

4. A tube for a pneumatic tire open at both ends having one end beaded and circumferentially extensible and the other end circumferentially non-extensible, whereby the beaded and extensible end is adapted to be inserted within the non-extensible end and held therein by inflation: substantially as set forth.

5. A tube for a pneumatic tire open at both ends made of bias fabric, whereby it is adapted to be distended and shortened by inflation, one end of such tube being made circumferentially non-extensible for a short distance and the other being beaded exteriorly, and adapted to be inserted into the non-extensible end until the bead is back of the non-extensible portion thereof: substantially as set forth.

6. A pneumatic tire comprising a casing consisting of tubing open at both ends having its ends joined by the insertion of one end within the other, the exterior end being circumferentially non-extensible and the interior end being exteriorly beaded, the bead being lodged back of the non-extensible portion of the exterior end, in combination with an inflatable air-tube placed within such casing and having closed ends adapted to lap or abut when inflated, and suitable means for inflating the inner tube from the exterior of the casing: substantially as set forth.

7. A pneumatic tire comprising a casing consisting of tubing open at both ends having its ends joined by the insertion of one end within the other, the exterior end being circumferentially non-extensible and the interior end being beaded and elastically extensible circumferentially, in combination with an inflatable air-tube placed within such casing and having closed ends adapted to lap or abut when inflated, and suitable means for inflating the inner tube from the exterior of the casing: substantially as set forth.

8. In combination with the tubular case having open ends adapted to be telescoped one within the other, the lug D projecting from one end and adapted to enter the other end, said lug and said other end having respectively counterparts of interlocking devices: substantially as set forth.

In testimony whereof I have hereunto set my hand, in the presence of two witnesses, this 11th day of May, 1895.

THOS. B. JEFFERY.

Witnesses:
O. B. JONES,
W. P. HARTWELL.